(12) United States Patent
Freeman et al.

(10) Patent No.: US 7,867,532 B2
(45) Date of Patent: Jan. 11, 2011

(54) SYSTEM AND METHOD FOR FLAKING GRAINS

(75) Inventors: Steve R. Freeman, Windsor, CO (US); Charles H. Hoff, Bellvue, CO (US)

(73) Assignee: Lextron, Inc., Greeley, CO (US)

( * ) Notice: Subject to any disclaimer, the term of this patent is extended or adjusted under 35 U.S.C. 154(b) by 643 days.

(21) Appl. No.: 11/864,390

(22) Filed: Sep. 28, 2007

(65) Prior Publication Data
US 2009/0087523 A1 Apr. 2, 2009

(51) Int. Cl.
*A23P 1/00* (2006.01)

(52) U.S. Cl. .................. 426/231; 426/621; 426/511; 700/83

(58) Field of Classification Search ......... 426/231–233, 426/510–511, 523, 518, 621; 99/325–338, 99/344; 700/83
See application file for complete search history.

(56) References Cited

U.S. PATENT DOCUMENTS

| | | | | |
|---|---|---|---|---|
| 4,973,484 A * | 11/1990 | Pierik | | 426/457 |
| 4,991,077 A * | 2/1991 | Kawasaki et al. | | 700/83 |
| 5,072,887 A | 12/1991 | Thom, Jr. | | |
| 5,248,469 A | 9/1993 | Wilhelm | | |
| 5,361,681 A * | 11/1994 | Hedstrom et al. | | 99/331 |
| 5,366,167 A | 11/1994 | McCarthy | | |
| 5,566,902 A | 10/1996 | Thom, Jr. | | |
| 5,598,770 A * | 2/1997 | Campbell et al. | | 99/487 |
| 5,609,308 A | 3/1997 | Thom, Jr. et al. | | |
| 5,835,898 A * | 11/1998 | Borg et al. | | 705/8 |
| 6,159,519 A * | 12/2000 | White et al. | | 426/510 |
| 6,428,831 B1 * | 8/2002 | Brown | | 426/231 |
| 6,573,994 B2 | 6/2003 | Bachman et al. | | |
| 7,486,997 B2 * | 2/2009 | Muneta | | 700/21 |
| 2003/0061004 A1 | 3/2003 | Discenzo | | |
| 2004/0010326 A1* | 1/2004 | Schuster | | 700/79 |
| 2005/0074529 A1* | 4/2005 | Cohen et al. | | 426/106 |
| 2006/0070530 A1* | 4/2006 | Meade | | 99/360 |
| 2006/0081135 A1* | 4/2006 | Britton et al. | | 99/486 |
| 2007/0071857 A1* | 3/2007 | Vemuganti | | 426/231 |
| 2007/0112912 A1 | 5/2007 | Weber et al. | | |

OTHER PUBLICATIONS

"PID controller", available at http://en.wikipedia.org/wiki/PID_controller, Wikipedia, printed Sep. 19, 2007, pp. 1-8.

* cited by examiner

*Primary Examiner*—Drew E Becker
(74) *Attorney, Agent, or Firm*—Sheridan Ross, P.C.

(57) ABSTRACT

A system and method are provided for flaking grains. The system and method provide for an automated system to minimize manual intervention, yet optimize a steam flaking process. A calibration technique may be included to assist in automatic adjustment of system parameters to account for less than optimal operating conditions. Control of the system may occur from a remote location wherein a user is provided an interface, and a user's computer communicates with an industrial controller such as a PLC, through the Internet or a private network. The PLC is typically located at the site where the grain is to be processed. The PLC may receive various system inputs and generate system control outputs in accordance with programs installed on the PLC, or through some selected manual intervention as controlled by the user at the remote location.

7 Claims, 8 Drawing Sheets

SYSTEM AND METHOD FOR FLAKING GRAINS

FIELD OF THE INVENTION

The present invention relates to a system and method for flaking grains, and more particularly, to an automated system and method for steam flaking of grains that minimizes manual intervention, yet optimizing a steam flaking process, taking into account control factors including density of the flaked grains, as well as the amount of gelatinization of the flaked grains.

BACKGROUND OF THE INVENTION

Feed grain has been used for a number of years for feeding cattle and other domesticated animals. Grain flaking processes are well known for making the grains more easily digestible by an animal. Increased digestibility of grain has a directed result on increasing the ability of the animal to gain weight or increase milk production, such as for dairy cattle. Steam flaking of grain is common for grains such as barley, sorghum, wheat, and corn. A number of methods have been developed that are tailored to processing these grains to make them more digestible.

A basic steam flaking grain process includes subjecting the grain to a steam-pressurized environment, such as a steam chest that is filled with pressurized steam at selected temperatures and pressures. The grain held within the steam chest absorbs moisture from the steam. Grain flaking is done in a continuous process. The grain travels through a steam pressurized environment for a controlled period of time prior to being transported to a rolling station where pressure rollers are used to flake the grain forming discrete pieces of grain, referred to as grain flakes.

One primary objective in the steam flaking process is to gelatinize the starch in the grain, and this gelatization process solublizes the grain thereby making it more easily digested by an animal. Thus, increasing the starch digestibility of the grain can maximize the digestive efficiency of the animal, which in turn enhances the performance of the animal.

Over or under processing the grain directly affects an animal's ability to efficiently digest the grain. Therefore, it is known to place various controls in a grain flaking process to ensure that the grain is optimally processed. Variables such as temperature and pressure within the steam chest, as well as moisture content of the grain during processing are known variables to be monitored and adjusted in order to optimize the steam flaking process. However, traditional methods for steam flaking of grain require various manual actions to be taken in order to finely tune the machinery in order to optimize flaking. Other factors that influence creation of the gelatinized starch include the grain quality and the density of the grain. Grain quality and density differ among different types of grain, as well as among different batches of grains produced from different locations. Ultimately, to effectively penetrate a starch granule to cause it to be gelatinized, a number of factors must be tightly controlled during the grain flaking process, and the failure to adequately monitor and control these variables will result in under or over processing of the grain.

Therefore, it is one object of the invention to provide greater control over a steam flaking grain process. It is yet another object of the present invention to increase control over the process through automation, and the simultaneous monitoring of a number of system parameters in order to maximize efficiency in the process. It is another object of the present invention to increase the repeatability and consistency of the steam flaking process, thereby maintaining a desired level of gelatinization yet minimizing manual intervention. It is yet another object of the present invention to provide the capability to periodically test the quality of the processed grain, and to adjust various system parameters without shutdown of the system, yet quickly reacting to substandard grain flaking results. It is yet another object of the present invention to provide a system and method wherein the grain flaking process is adaptable to many different types of grains without having to manually intervene to adjust a significant number of system parameters.

One example of a prior art reference disclosing a method for steam flaking of grain includes the U.S. Pat. No. 6,428,831. This reference more specifically discloses a steam flaking process wherein resulting flakes have a predetermined density and a predetermined amount of gelatinization by weighing sampled flakes to determine density of the sampled flakes, and then adjusting temperature, pressure, the retention time in the steam chest, and the size of the gap between the rollers. In another embodiment, the sampled flakes are cooled for a predetermined time, and then screened before measuring density.

One reference disclosing a device for automatically adjusting the gap between the rollers in a grain flaking process includes U.S. Pat. No. 5,072,887. The device disclosed includes simultaneously operated screw jacks that adjust the gap and a shaft mounted gearbox to accomplish the drive of a secondary roll from the primary roll. A tensioning device permits the automatic adjustment of the gap between the rolls while maintaining tension between drive belts utilized for driving the shaft mounted gearbox.

While these references may be adequate for their intended purpose, there is still a need to address the deficiencies as set forth above.

SUMMARY OF THE INVENTION

In accordance with the present invention, a system and method for flaking grains is provided. According to the invention in a preferred embodiment, a quantity of grain to be processed is transported and loaded into a steam chest. A plurality of zones within the steam chest is designated for monitoring. The grain within the steam chest is subjected to pressurized steam at a desired temperature and for a selected duration of time. After treatment within the steam chest, the grain is directly transferred to a roll mill wherein a pair of rollers flake the grain, thereby providing a final product that may be fed to domesticated animals. The quality of the flaked grain is monitored, and deficiencies in the sampled flakes automatically result in adjustment of system parameters to return the processed grain to an optimal state.

In another aspect of the present invention, a high level of automation is achieved by use of computer controls, and various system inputs are used to report the status of the grain flaking system enabling various system parameters to be automatically adjusted.

In another aspect of the present invention, automatic start and shutdown routines may be incorporated in the control system, thereby reducing manual intervention, and providing a more efficiently operating grain flaking system and method.

In accordance with another aspect of the present invention, quality control is achieved through an automatic calibration procedure wherein grain flakes are sampled for parameters such as density, and depending upon the results, various system parameters are automatically adjusted to account for any needed correction to address a deficiency in the quality of the flaked grain.

In accordance with another aspect of the present invention, remote control capability is provided for the system in which an operator may completely control the system, but be physically separated from the location of the system. In accordance with this aspect, the present invention utilizes a computer such as a programmable logic controller (PLC) in conjunction with a visual monitoring system to fully monitor the status of system equipment, as well as quality control results that are obtained. A remote computer may be linked via the Internet or a private computer network to the PLC at the system location such that the operation, shutdown, and calibration of the grain flaking system may occur remotely by the user from the remote computer.

In terms of controlling the quality of the flaked grain, it is noted in the present invention that moisture does not have to be measured and, rather, a calibration of the system may occur by various other means to include a visual analysis of the flaked grain, and measuring the density of the flaked grain.

Other features and advantages of the present invention will become apparent from review the following detailed description, taken into conjunction with the review of the following drawings.

BRIEF DESCRIPTION OF THE DRAWINGS

FIG. 7 is another user interface screen illustrating functions relating to alarms established for the system; and FIG. 8 is another user interface screen illustrating functions relating to emergency stops established for the system.

DETAILED DESCRIPTION

Figure 1:
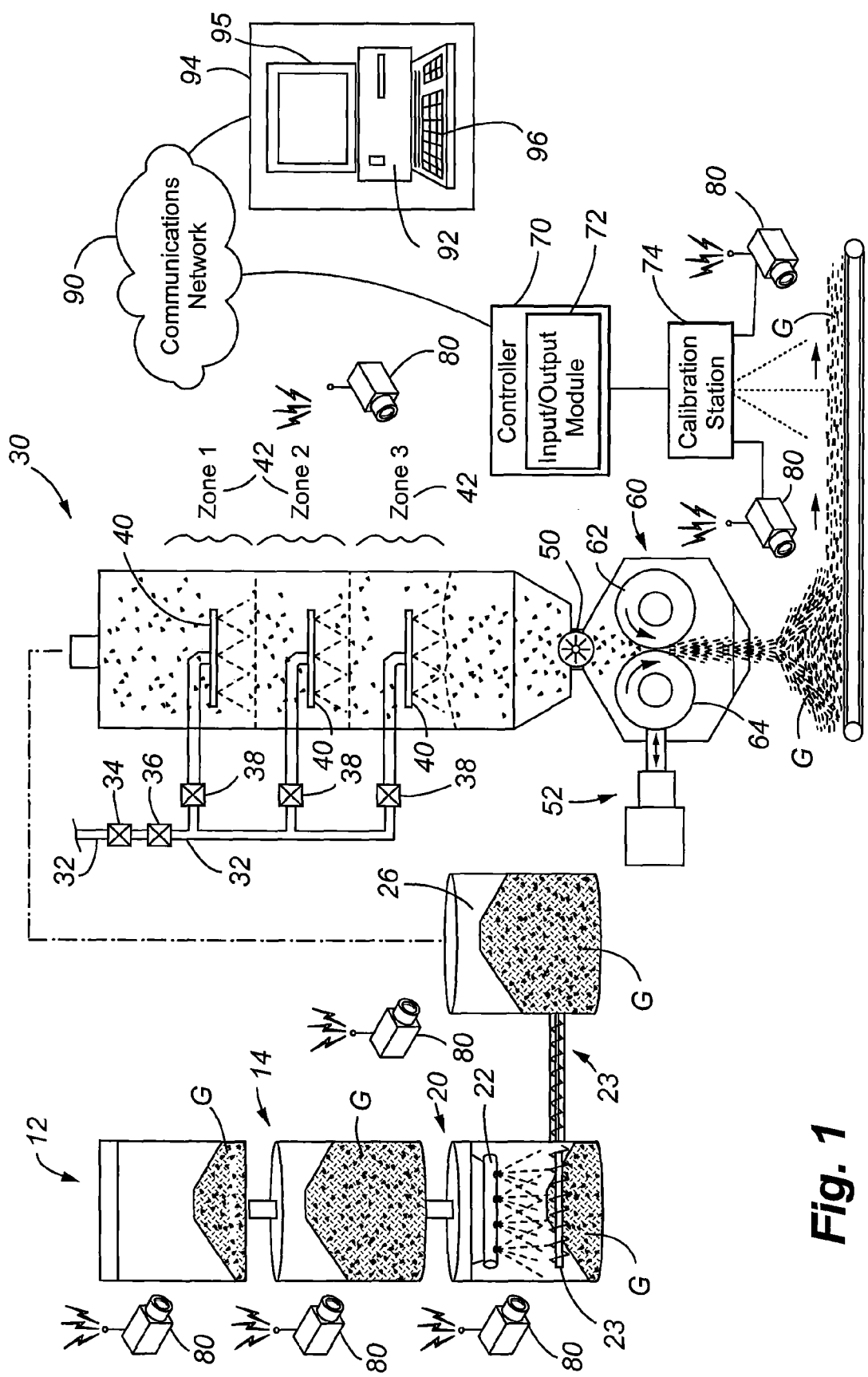
FIG. 1 is a schematic view of the system of the present invention.

Referring first to FIG. 1, the grain flaking system of the present invention is illustrated in a schematic view. The grain flaking system includes a plurality of processing stations resulting in production of processed grain that is more easily digested by an animal.

The grain G may be stored in a holding bin 12. In an optional first processing step, a cleaning station 14 may be provided wherein the grain G is transported to the cleaning station and cleaned by a standard grain cleaner/shaker (not shown) prior to entering a treatment station. A treatment station 20 may be provided, for example, to apply chemicals or a combination of chemicals and water by a spray bar 22 as grain is moved by an auger 23 into another intermediate tank or soak tank 26. The grain will soak in water and treatment chemicals (if applied) for a predetermined amount of time. The grain may then be transferred to a steam chest 30 such as by an auger (not shown) that interconnects an outlet of the soak tank 26 to an inlet of the steam chest 30.

It shall be understood that the particular treatment stations and holding bins shown are simply one example of how a particular grain may be handled prior to being placed in the steam chest 30. Depending upon the type of grain and other grain characteristics, other processing steps may be incorporated to place the grain in the most optimal condition for steaming.

The steam chest provides steam at desired temperatures and pressures in designated zones of the steam chest so that the grain can be rolled at a subsequent rolling mill station. Steam is provided to the steam chest 30 by a steam line 32 wherein a plurality of valves control the amount and pressure of steam to the steam chest. FIG. 1 illustrates a supply valve 34 placed upstream of a proportional valve 36. The supply valve can be operated to an on or off position to supply or shut off steam to the steam chest. The proportional valve 36 may be finely tuned to meter a desired amount and pressure of steam to the steam chest. Downstream from the proportional valve may be a plurality of zone valves 38 that control steam to various zones or areas within the steam chest. A zone or area within the steam chest may correspond to a physical location within the steam chest where temperature, pressure, or other parameters may be measured in order to ensure that the grain is properly treated during steaming. One or more steam distributors 40 allow the steam to pass into the steam chest. As illustrated in FIG. 1, three zones 42 are provided and which may be used as control points for processing of the grain therein.

After the grain has been treated within the steam chest, a peg feeder 50 is used to meter the processed grain to a rolling or flaking station 60. The rolling station 60 includes a pair of complementary rollers, namely a stationary roller 62 and a moveable or adjustable roller 64. As discussed further below, the spacing of the rollers may be adjusted to optimize the processing of the grain by use of a hydraulic unit 52 that incrementally changes the position of the moveable roller to increase or decrease the space from the stationary roller.

After the grain has been flaked, the grain may be analyzed by a calibration station 74 that communicates with a controller 70 such as a PLC that provides automatic control to process the grain within the system. The PLC includes an input/output module 72 that receives inputs from the system, and sends control outputs to the system as determined by instructions from the PLC. As also illustrated, a plurality of cameras 80 may be placed along various locations within the system in order for an operator to view the system in a remote operation mode. The cameras may provide digital images by use of a wireless connection to the PLC.

In accordance with one aspect of the present invention, an automatic startup procedure may be provided as facilitated by the controller 70 in conjunction with observed inputs to the controller from the system.

Figure 2:
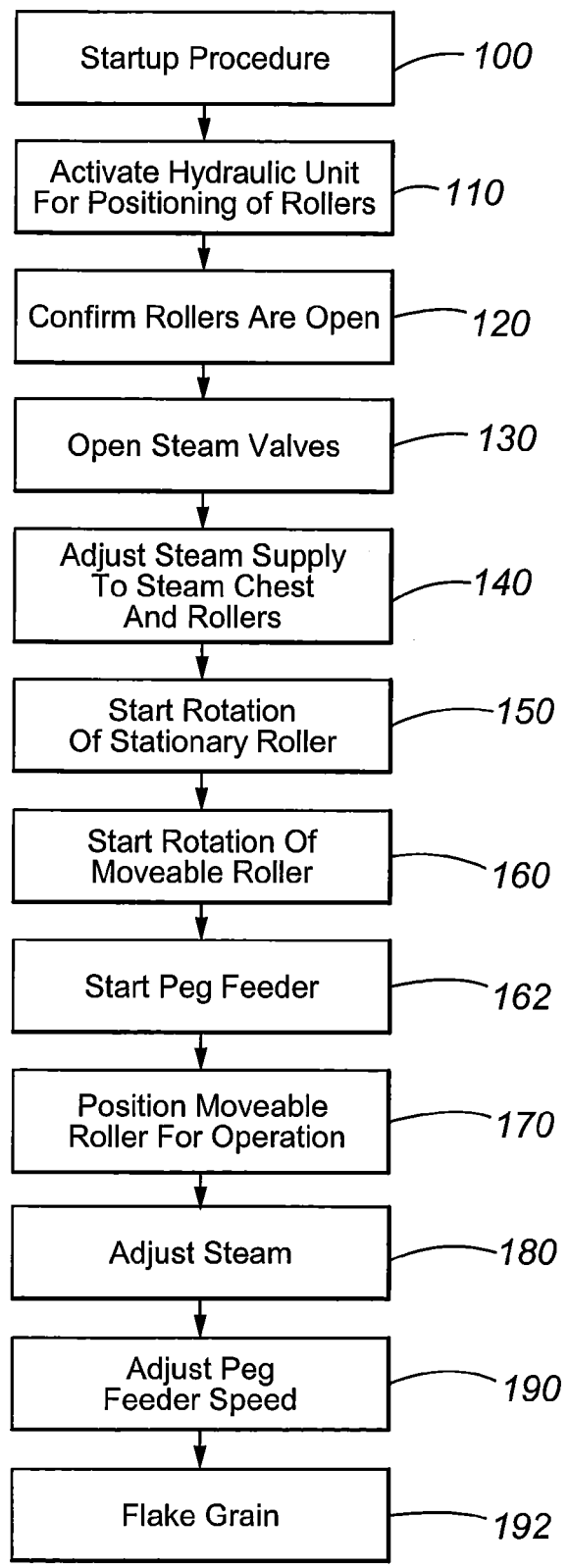
FIG. 2 is a block diagram of the automatic startup procedure of the present invention.

Referring now to FIG. 2, the automatic startup procedure 100 comprises a first step 110 of activating a hydraulic unit for relative positioning of the rollers 62 and 64. The hydraulic unit provides power to move the adjustable roller 64 from incremental positions closer to or farther away from the stationary roller 62. At step 120, the position of the rollers is confirmed as being opened or apart such that there is at least some spacing between the stationary and moveable rollers. At step 130, the steam supply valve 34 is opened, as well as the proportional valve 36 opening to the same setting as the immediate or prior processing run. As the steam chest begins to heat and pressurize, the proportional valve 36 adjusts to optimize the desired quantity and pressure of steam supplied to the steam chest. The position of valves 38 may be manually set or automatically set so that the desired flow of steam passes to each particular zone. Additionally, steam may be applied to the rollers 62 and 64 in order to heat the rollers such that the grain does not prematurely cool while being flaked.

At step 150, rotation of the stationary roller commences and at step 160, rotation of the moveable roller commences. At step 162, the peg feeder 50 commences so that a desired quantity of grain is passed to the rolling station 60. Prior to commencement of the peg feeder, the steam chest will achieve pre-designated temperature and pressure set points so that the grain is not under or over processed.

At step 170, the moveable roller is moved to its operation position, namely, a predetermined spacing from the stationary roller.

At step 180, final adjustment of the proportional steam valve 36 is made to account for temperature differentials within the zones that are not within prescribed limits.

At step 190, the peg feeder speed is adjusted to meter a desired amount of the grain over a period of time taking into account prior calculations that ensure the grain is adequately processed before leaving the steam chest. Finally, at step 192, the grain is flaked by passing through the rolling station 60.

Figure 3:
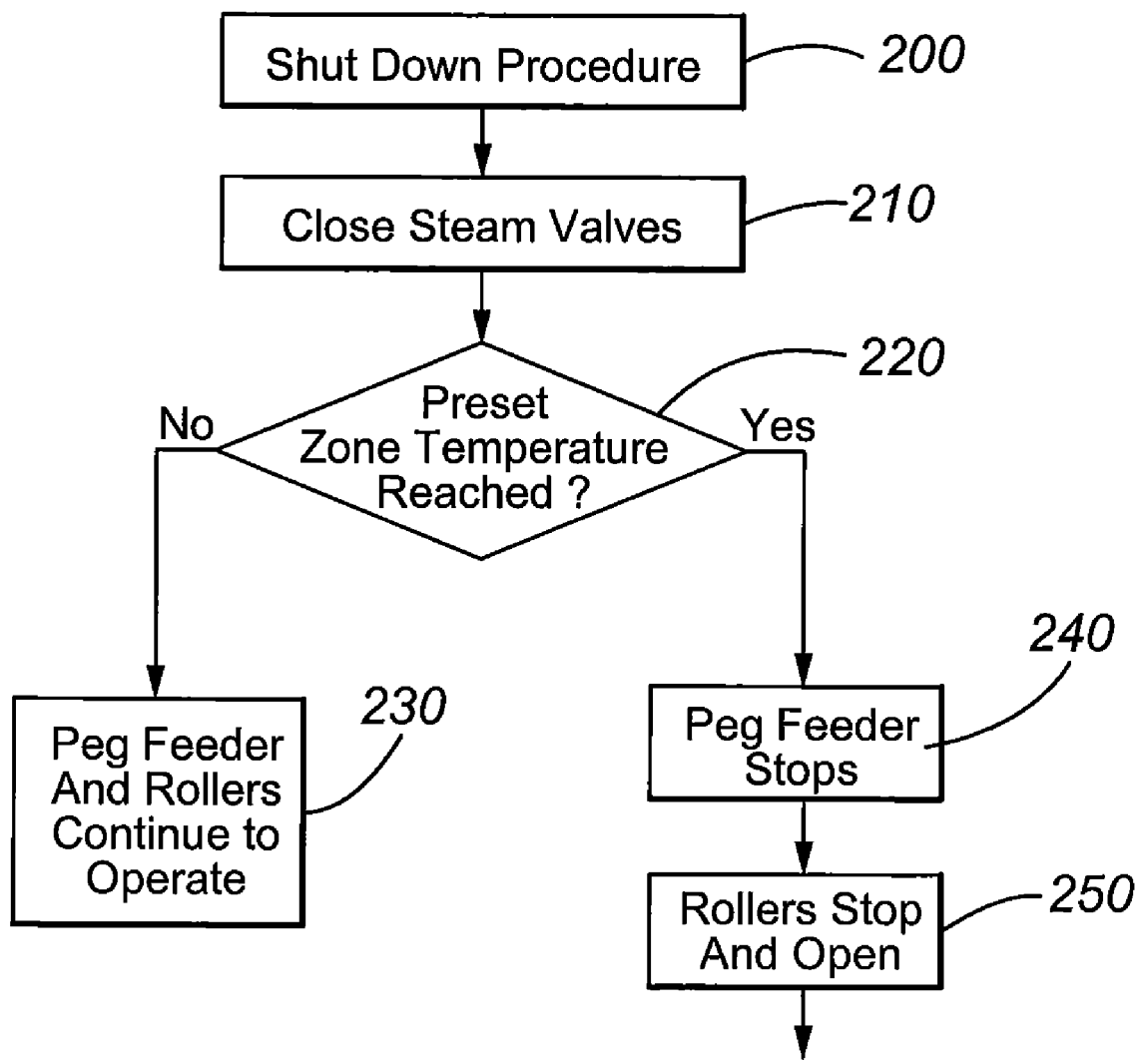
FIG. 3 is a block diagram of the automatic shutdown procedure of the present invention.

FIG. 3 illustrates the automatic shutdown procedure in accordance with the present invention. As shown, the shutdown procedure 200 is conducted when it is desired to cease operation of the system, such as at the end of an operating day. At step 210, the steam supply valve 34 and proportional valve 36 are closed. At step 220, a measurement is made of the zone temperatures and then compared to the preset zone temperatures for shutdown. More specifically, it is preferable to evacuate the majority of the grain within the steam chest such that when the steam chest cools and preset cool down zone temperatures are reached, the peg feeder and rollers are stopped to prevent the grain that has not been effectively processed from being flaked. Accordingly, at step 220 a determination is made whether the preset zone temperatures have been reached. If those temperatures have not been reached, the peg feeders and rollers continue to operate to finally process the remaining amount of grain in the steam chest as shown at step 230. At step 240, if the preset zone temperatures are reached, the peg feeder stops and at step 250, the rollers stop and are opened. Any amount of grain remaining within the steam chest may be removed or held for processing the next day.

In accordance with yet another aspect of the present invention, it is contemplated that the system 10 of the present invention may be operated remotely such that the operator is located at a remote location and the operator utilizes various interface screens to control the system. Accordingly, the controller/PLC 70 is located with the equipment of the system 10, and the PLC communicates over a communications network 90 such as the Internet or a private network to a remote computer 92 located at the remote location 94. The computer 92 includes an interface program that generates a user interface such as a viewable monitor 95 that allows the operator to control the system. The user interface screens show the status of the system to include such parameters as temperature within the zones of the steam chest 30, pressures within the steam chest, and calibration results as calculated by the calibration station 74. The user interface also allows the user to issue control commands by an input device such as a keyboard 96, either through one or more grain flaking programs in automatic mode or individual commands to control individual stations or pieces of equipment operating in the system. The cameras 80 allow the user to view the various processing stations and in the event of an alarm condition, the camera images may be used to help diagnose or troubleshoot the problem at hand.

In terms of the specific structure for the flaking rollers, the rollers may be driven by relatively large motors such as 60 amp motors for each roller. As mentioned above, the motors may be staggered during startup. One method to control the spacing between the rollers is by use of the hydraulic cylinder 52 attached to the moveable roller. A solenoid valve can be used to place the cylinder at open, neutral, or varying closed positions. In order to prevent damage to the rollers, the rollers are preferably not in a closed position without grain flowing between the rollers. The gap between the rollers may be either manually or automatically set. In the automatic mode, the spacing of the rollers can be preset based upon various parameters to include the type of grain being processed, among other parameters. This spacing is but one parameter that can be controlled by a grain flaking program residing in the remote computer.

With respect to the specific structure of the peg feeder 50, a variable speed motor may be used to drive the feeder and speed may be manually or automatically controlled.

For the steam chest 30, although three temperature zones are illustrated, it shall be understood that the steam chest may have more or fewer zones designated to include provision of additional or fewer steam distributors, as well as fewer or more devices to measure the temperature and pressure within the steam chest. For example, if it were desired to provide five measurement zones within the steam chest, then two additional zones can be designated with corresponding temperature and pressure sensing elements located at those zones. The steam supplied to the steam chest may be, for example, 35 psi. The proportional valve 36 may ultimately determine the temperature and pressure within the steam chest and, as mentioned, the proportional valve may be incrementally controlled to provide a greater or lesser flow of steam to the steam chest.

Various equipment safety features may be incorporated to include an emergency stop control that opens the rollers, and stops all motors, as well as closing steam valves to the steam chest. This emergency stop control may be incorporated within a user interface feature as discussed below, or may be provided manually at the location of the system. One condition that may trigger an alarm thus warranting activation of an emergency stop may include an over current or under current condition at the roller motors or the peg feeder motor. Accordingly, electrical current may be monitored at the location of each of the motors within the system. Additionally, loss of hydraulic pressure at the hydraulic unit may also trigger an alarm condition in which an emergency stop may be warranted.

With respect to the control system of the present invention, one example of an acceptable industrial controller 70 is a GE Versamax PLC. The user interface may include a GE Quick Panel View touch screen for Human Machine Interface (HMI) application development. With respect to the Internet connection between the PLC 70 and the computer 92 located at the remote location, the connection may be achieved by a HMI software application developed in Visual Basic.net programming software.

For the basic user interface screens, they may include a startup screen, an automatic operating screen, a shutdown screen, a manual operating screen, a screen that may provide various reports for the system, and a parameter setup screen.

Multiple remote users may operate the onsite PLC. However, only one remote user should have the capability to operate the PLC at any time. Thus, an input may be provided to the PLC to establish remote control priority in the event more than one remote user is present at any one time. The input to the PLC may be a "soft button", or a physical input from a switch.

Specific inputs to the PLC from the system may include voltage and/or amperage from the roller motors, an HMI select switch, an indication of rollers open or closed, steam pressure within the steam chest at various zones, temperature within the steam chest at various zones, the amperage of the roller motors, the amperage of the peg feeder, hydraulic pressure of the hydraulic unit, as well as inputs from the calibration station reporting on quality of the flaked grain. Inputs may further include the visual images provided by the various cameras 80 that enable a remote operator to view the system as it operates.

Outputs to the system from the PLC may include control of the roller motors, control of the peg feeder motor, speed of the roller and peg feeder motors, opening and closing of the moveable roller 64 with respect to the stationary roller 62, opening and closing of the valves 32, 34 and 38, as well as selective proportional control of valve 36. Outputs may further include various alarm conditions and emergency stops triggered by out of limit conditions or failure of the various inputs.

Figure 4:
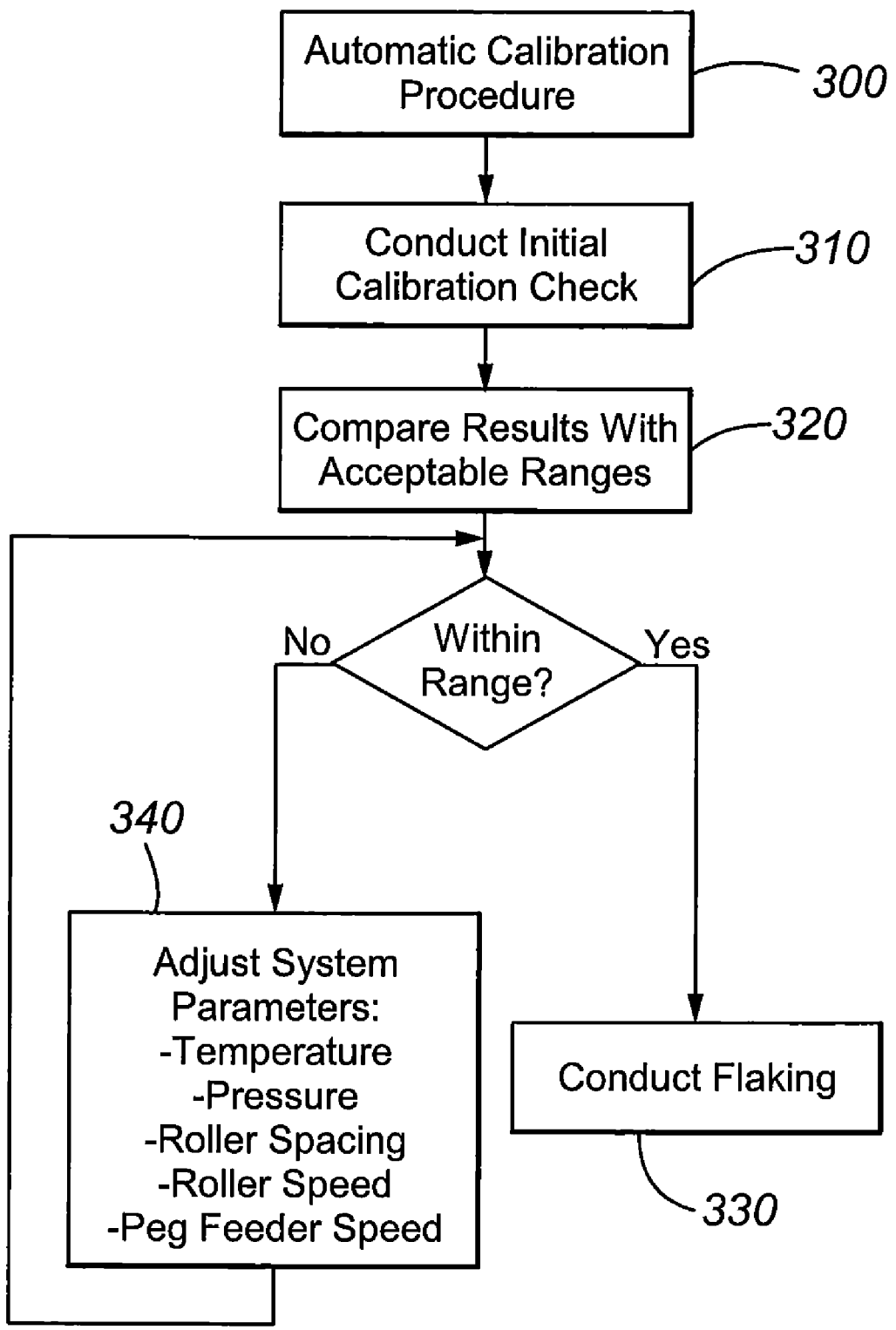
FIG. 4 is a block diagram of an automatic calibration procedure of the present invention.

FIG. 4 illustrates a block diagram for an automatic calibration procedure in accordance with the present invention. One particular calibration technique that may be used in the calibration of the present invention may include the one disclosed in the U.S. Pat. No. 6,573,994 entitled "OPTICAL METHOD TO MONITOR THE PROCESSING OF A STARCH CONTAINING MATERIAL", this reference being incorporated herein in its entirety. This calibration technique includes an optical method to measure certain optical characteristics of starch containing material such as grain during and/or after processing. Certain properties of the processed starch containing materials such as flake weight and starch availability can be accurately estimated from just the measured optical characteristics. The calibration station 74 as shown in FIG. 1 is positioned after the grain has been flaked. However, it is contemplated that one or more calibration stations may be adopted to test or otherwise observe the grain at various processing points. For example, a calibration station could be placed between the steam chest and the peg feeder to measure certain characteristics of the grain prior to being flaked. One advantage with respect to the calibration method disclosed in the '994 Patent is that the grain flakes do not have to be weighed in order to estimate flake weight and density.

As shown in FIG. 4, the automatic calibration procedure 300 begins with an initial calibration check at step 310. This step 310 may incorporate the calibration technique disclosed in the U.S. Pat. No. 6,573,994. The preset or desired processing parameters are adjusted based on data generated from calibration station and input to the PLC. At the PLC, the data is analyzed to confirm that the desired flake weight and starch availability has been achieved. Thus, at step 320, the results of the calibration observations are compared with acceptable ranges. If the results are within specified ranges, then at step 330, flaking operations can be conducted or continued. If the calibration results are found to be out of range or out of limits, various system parameters can be adjusted as shown at step 340, such as temperature and pressure within the steam chest, roller spacing, roller speed, and peg feeder speed. Each of these system parameters may be adjusted separately, or in various combinations with one another based upon the calibration results to move the system back into production of acceptable flaked grain products.

At the user's computer, various user interface screens may be provided to allow the user to select automatic adjustment based upon calibration results, or to allow the user to manually adjust system parameters in an effort to return the system to production of acceptable flaked grains. For example, a user interface screen may recommend a standard calibration adjustment that may, for example adjust the temperature and pressure within the steam chest. The recommend adjustments may be derived from historical data where incremental adjustments to system parameters results in difference qualities of flaked grains.

In order to minimize manual intervention at the calibration station, a bypass may be provided to direct a certain percentage of grain over a specified time period into the calibration station where optical measurements are taken of the grain, the data is automatically uploaded to the PLC and then made available to the user at the remote location. An automatic and periodic calibration check ensures continuous system operation at parameters that result in optimum grain flaking.

Figure 5:
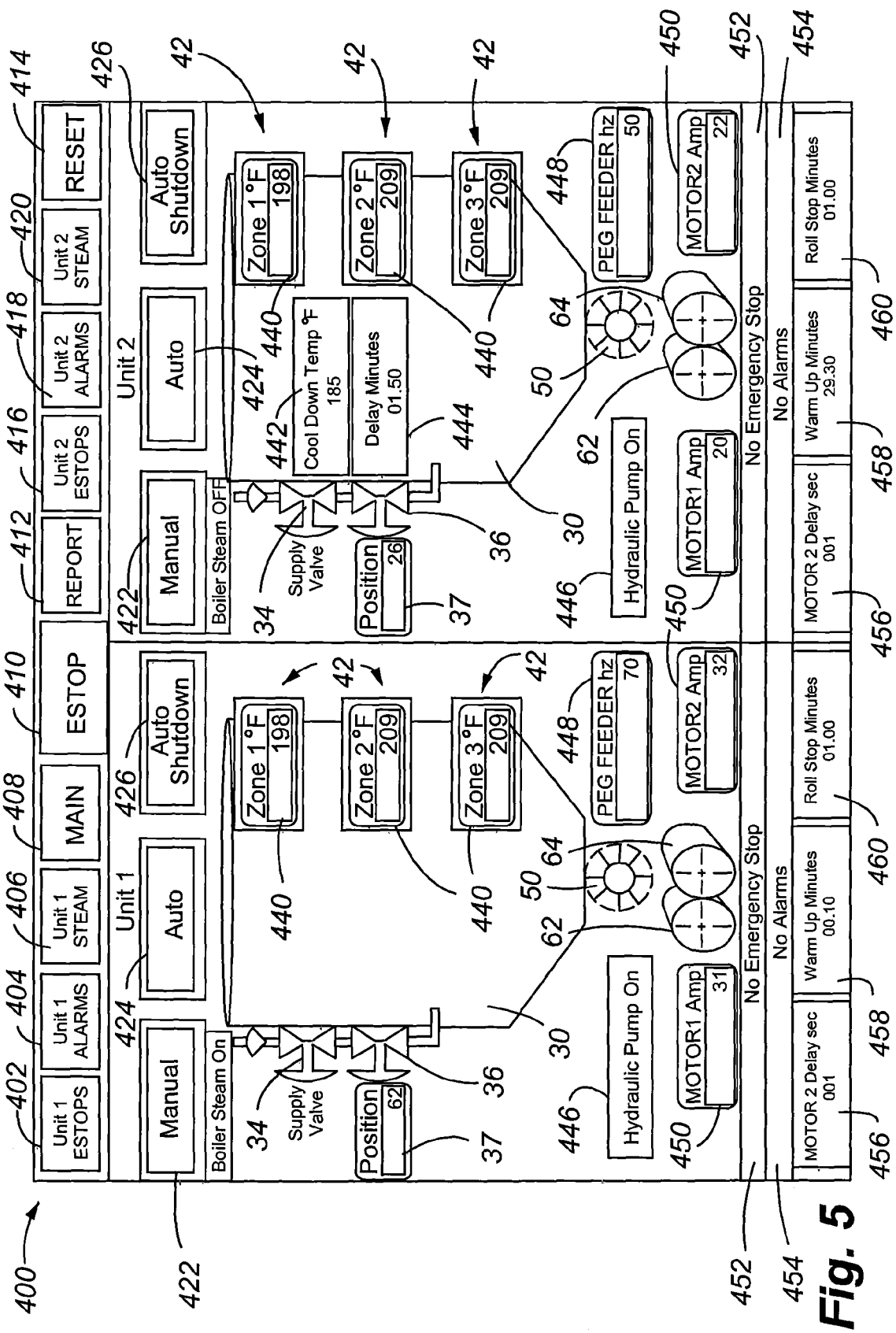
FIG. 5 is an example user interface screen generated by the remote computer in communication with the onsite PLC showing an overall system view and control functions.

Referring to FIG. 5, an example user interface screen 400 is shown for displaying the system status. This user interface screen may generate at the location of the remote computer. In the example of FIG. 5, two separate grain flaking systems are shown (Unit 1 and Unit 2), side-by-side on a single user interface screen. Thus, it is contemplated within the present invention that a user may automatically control more than one-grain flaking system, and such grain flaking systems may be located at completely different locations. The user interface screen 400 has an upper toolbar containing a number of functions. For example, the upper toolbar has Unit 1 estop button 402 for generating emergency stops for Unit 1. Unit 1 alarm button 404 corresponds to a display of alarm conditions that may be viewed at various stations within Unit 1. Unit 1 steam button 406 corresponds to control of steam supplied to the steam chest in the first unit. The main button 408 allows the user to move back to a main menu where other user interface screens may be accessed. The main estop button 410 is provided for the user to remotely cause a system stoppage for either the first or second units based upon reported alarms, or based upon a user judgment that an unsafe condition has arisen requiring a system stop, or another reason requires an emergency stop such as malfunction of a particular station. The report button 412 is provided to allow a user to generate system reports to include recordation of system parameters, operating times, amounts of grain processed, etc. The reset button 414 may be provided to give the user capability to reset an e-stop condition or to otherwise reset a system alarm that has occurred. Buttons 416, 418 and 420 are provided for control of Unit 2 and have the same functions described with respect to the Unit 1 buttons 402, 404, and 406 respectively.

Each of the unit or system views have various displays as to the system statuses. For example, each system view has a manual button 422 that allows the user to move to another user screen enabling the operator to manually control system stations or various components of a station. The manual button 422 may provide other functions such as a manual startup or shutdown of the system. Auto button 424 enables the operator to choose automatic system operation from a menu option wherein the system operates in accordance with one or more selected programs installed in the PLC, and various system parameters are continually monitored to ensure proper grain flaking. The automatic shutdown button 426 provides the operator the ability to commence an automatic shutdown procedure, such as discussed above with respect to FIG. 3.

As also shown in FIG. 5, schematic representations are shown of the steam chest 30. Schematic representations may also be provided of various control valves, such as the main supply valve 34 and the proportional control valve 36. The schematic representations can indicate whether a valve is opened or closed, and in the case of valve 36, the particular position of the valve may be shown at display position 37. In the example of Unit 1, the position of the valve 36 is shown at position 62, while the position of the valve in Unit 2 is shown at position 26. These numerical representations of the valve positions can correspond to how opened or closed the valve has been set, or how much steam is being supplied and under what pressure. Each of the system views also shows the zone temperature readings at displays 440. In the example of Unit 1, the boiler steam is indicated as being on while the boiler steam is being indicated as being off in Unit 2. The off status for the boiler steam in Unit 2 may indicate that either a manual or automatic shutdown procedure may be taking place. More specifically with respect to the Unit 2 view, displays 442 are provided regarding the cool down temperature, and the delay minutes 444 for the cool down. Thus, for Unit 2, a user may have decided to conduct a shut down and during the shut down, system parameters are shown to include the preset cool down temperature display and the delay minutes countdown display in which the rollers will shut off after cool down temperature has been reached and the peg feeder is off.

The system views may also indicate the status of the hydraulic system, both system views showing the hydraulic pump on status indicator 446. The system views also show parameters for the peg feeder, namely, the speed of the peg feeder in hertz (hz) shown at display 448. With respect to the rollers, the amperage of the motors is also shown at displays 450. Towards the bottom of each of these system views the current status of the systems are shown. In the example, display 452 indicates that there are currently no emergency stops and display 454 indicates that there are no alarms. If an emergency stop or alarm occurs, the screens at those locations would list the type of emergency stop and/or the type of alarm being experienced. Other system parameters may be shown to include the motor delay between stationary roller and moveable roller during startup 456, the required warm-up minutes during startup 458, and the roll stop minutes 460 after cool down temperature has been reached and the peg feeder is off.

Figure 6:
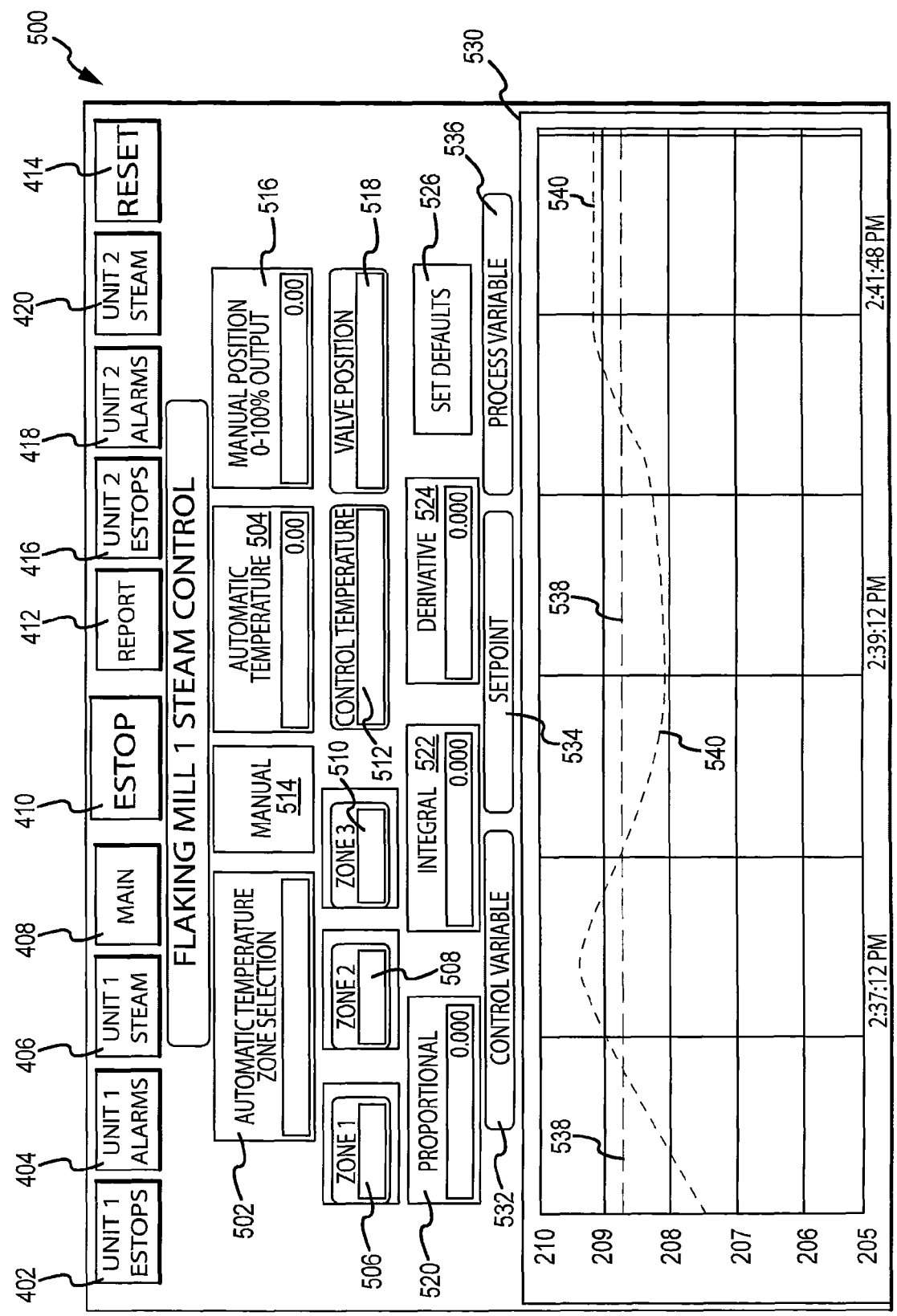
FIG. 6 is another user interface screen illustrating steam control functions.

FIG. 6 illustrates a user interface screen 500 for controlling of steam and related parameters in the steam chest. This user interface screen 500 corresponds to control of steam for a flaking mill operation, which could be for example the system shown in FIG. 5. In this user interface screen, the user may set various parameters for controlling of variables such as temperature within the steam chest. An automatic temperature zone selection feature 502 allows the user to select a particular zone to be controlled by either typing in the zone number, or choosing the zone from a pull down menu (not shown). Once the zone is selected, the user may then select the temperature at which the zone is to be maintained at by entering the desired temperature in the automatic temperature data entry block 504. The actual temperature for the various zones are shown at displays 506, 508, and 510 which correspond to the temperatures at zones 1, 2, and 3 respectively. The user may review pre-selected control temperatures at control temperature feature 512. This feature may list, for example in a pull down menu, the various zones and their corresponding control temperatures. If it were desired to adjust any of the automatic control temperatures, the user would go to the automatic temperature zone selection feature 502, select the desired zone, and then enter the desired temperature at entry 504.

The manual button 514 allows the user to switch either from an automatic temperature control, or a manual temperature control. More specifically, if the user selects the manual button and the system is currently in the automatic temperature program, the automatic temperature control program will be disabled and the user may then manually set temperatures for the zones, and to be held at those temperatures until either the user deactivates the manual feature 514, or otherwise changes the temperatures while in the manual mode. Manual adjustment of the zones could be accomplished by first placing the system in the manual mode by activating button 514, then selecting the zones and temperatures through another user interface screen (not shown) similar to screen 500 wherein there is a zone selection feature and a temperature entry. Another way in which to manually control the temperature within the zones is to adjust the position of the steam valves, such as proportional valve 36 by entering a desired value in the manual position output data entry block 516. For example, if the user wished to increase the temperature within each of the zones, the user could chose to increase the percentage output of steam from the valve by entering a higher value for the data entry, and then monitor the actual temperatures shown in displays 506, 508, and 510. When the desired temperatures were reached within the zones, the user could then again readjust the position output of the valve by decreasing the value entered in entry 516. Based upon the user's experience with a particular steam chest to include pre-recorded data regarding valve positions and temperatures, the user could easily select the position output of entry 516 to obtain an approximate temperature, and then fine-tune the entry at 516 to precisely control the temperatures within the zones once actual temperatures were observed. In addition to control of the proportional valve 36, the manual position output feature 516 could also be used to separately control each of the zone supply valves 38.

The valve position display 518 displays the valve position when the system is in the automatic temperature mode. Thus, the user is able to view the zone temperatures when the system is in the automatic mode, as well as the valve position of the selected valve.

The proportional 520, integral 522, and derivative 524 displays show instrumentation control loop parameters or turning factors that are used to maintain preset temperatures while in the automatic mode in accordance with a control loop algorithm. As understood by those skilled in the art, proportional-integral-derivative controllers (PID controllers) refer to a control loop feedback mechanism that controls a system by correction of errors between a measured process variable and a desired set point by calculating and then outputting a corrective action that adjusts the process. A PID controller also involves the use of an algorithm having the three separate parameters, namely the proportional, integral, and derivative values. The proportional value determines the reaction to the current error, the integral determines the reaction based upon the sum of recent errors, and the derivative determines the reaction to the rate at which the error has been changing. The relationship of these three parameters may be used to adjust the process via one or more control elements, which in the present case can be the position of the steam control valves. Although proportional, integral and derivative values are illustrated, it shall be understood that adequate control might be achieved by only controlling one or more of the parameters. Those skilled in the art can appreciate that the PID values in 520, 522, and 524 can be modified in accordance with a control loop algorithm to provide responsive system control based upon automatic temperature inputs as compared to actual temperatures within the steam chest. These PID values or tuning factors can be individually adjusted, or adjusted in combination with one another to fine tune performance of the system taking into account environmental factors that may not allow a pre-programmed algorithm to adequately maintain temperature control.

The set defaults button 526 enables an operator to automatically return control of the system back to a default program. This may be advantageous, for example, when either manual control places the steam chest out of normal temperature limits, or even when automatic operation causes improper steaming of the grain.

In the bottom portion of the screen 500 is a graph 530 that can generate visual graphs for the user to plot control variables, process variables, and process set points over time. For example, the control variable button 532, if selected, would allow the user to plot a control variable such as the position of a valve over time. For the set point button 534, this button could allow the user to graph the desired set points over time, such as the automatic temperatures selected for the zones in the steam chest. The process variable button 536 allows a user to graph a process variable over time, such as the actual temperature within a zone over time. Each of these three selections can be graphed simultaneously so the user can compare, for example, set points versus process variables and control variables over a time period. This data can then be recorded to establish historical data for optimum control parameters and overall system performance. In the example, line 538 could represent the pre-selected automatic temperature set point by activating button 532 while line 540 may represent a process variable observed, namely an actual temperature within a zone during the period of time by activating button 536. As shown, the set point is approximately 208.7° F., and the actual temperature observed within the zone fluctuates as shown over a period of approximately 4½ minutes. Consistent with the screen shot shown in FIG. 5, the upper portion of screen 500 also contains the same general toolbar including the various E-stop, alarm, reset and report functions.

Figure 7:
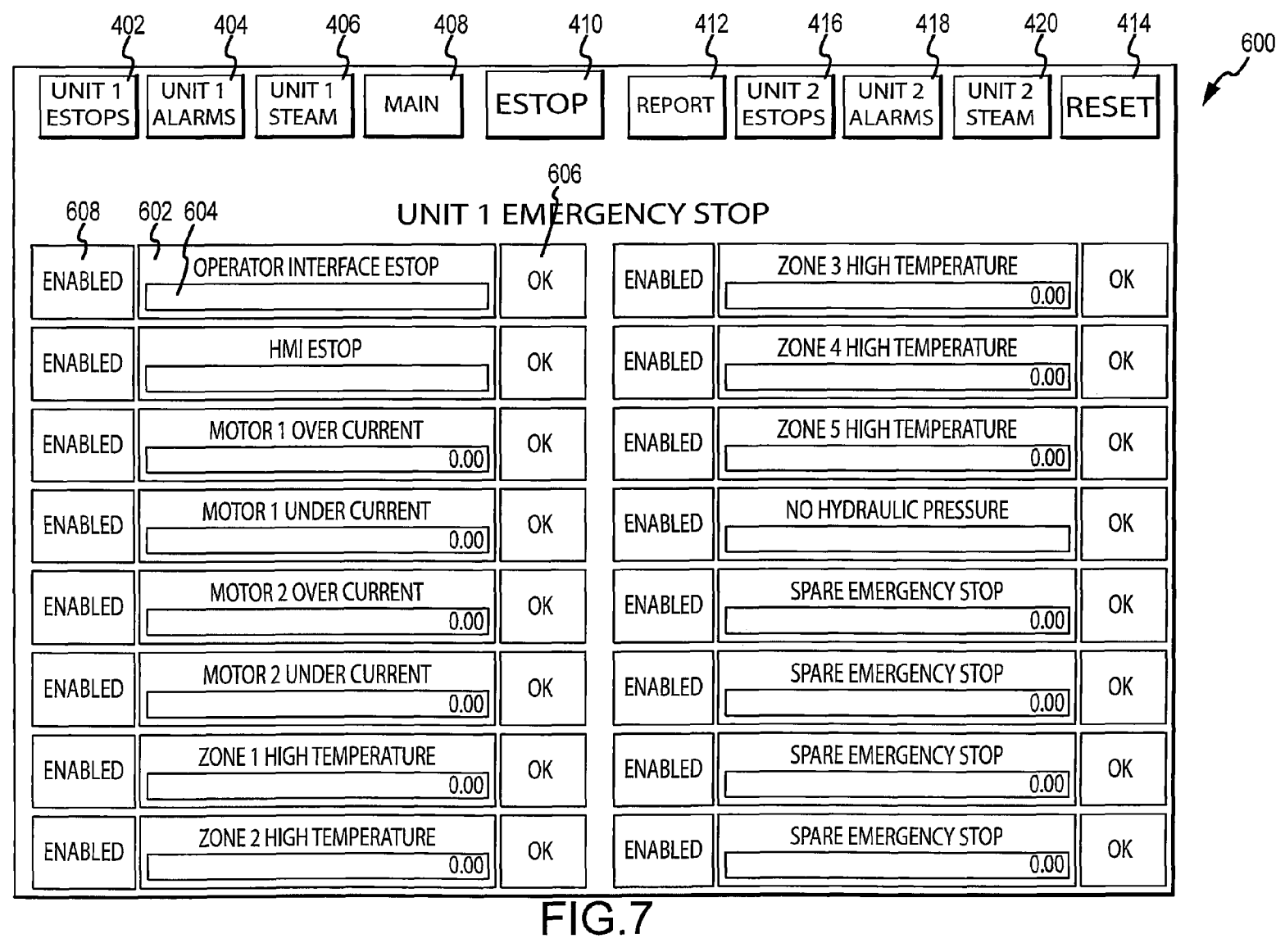

Referring to FIG. 7, another user interface screen 600 is shown which corresponds to setup and control of various emergency stops within the system. This screen also at its upper portion has the same general toolbar as shown in FIG. 5 including the various E-stop, alarm, reset and report functions. With respect to setup and control of the emergency stops, a plurality of different emergency stop conditions have been established and are listed in the screen shot. Each emergency stop corresponds to a control input to the PLC from the system that measures or reports on a particular parameter or condition within the system. For example, operator interface E-stop 602 corresponds to an operator emergency stop condition that may be manually generated by an operator who may be located at the grain flaking system and witnesses an unsafe condition. This operator interface E-stop could be activated by one or more emergency stop buttons located throughout the system enabling the user to immediately stop one or selected parts of the system. Some value or command can be entered into data entry block 604 further defining the E-stop condition. Once the E-stop condition is specified in data entry block 604, the user may click on button 606 that writes this command to the program of the PLC. The enabled button 608 allows the user to also manually enable or disable the particular E-stop condition. The user can click on this button 608 to enable or disable the corresponding E-stop condition. The other E-stop conditions are listed within the screen 600, and each includes a data entry block allowing the operator to define the conditions under which the E-stop is to be established, an OK button to write the command to the PLC, and an enable/disable button above that allows the user to manually enable or disable the particular emergency stop condition. As shown, the other listed E-stops include an HMI E-stop, motor over an under current E-stops, zone high temperature E-stops, a no hydraulic pressure E-stop, and various spare emergency stops that may be tailored specifically to special equipment installed at the location of the grain flaking equipment.

Figure 8:
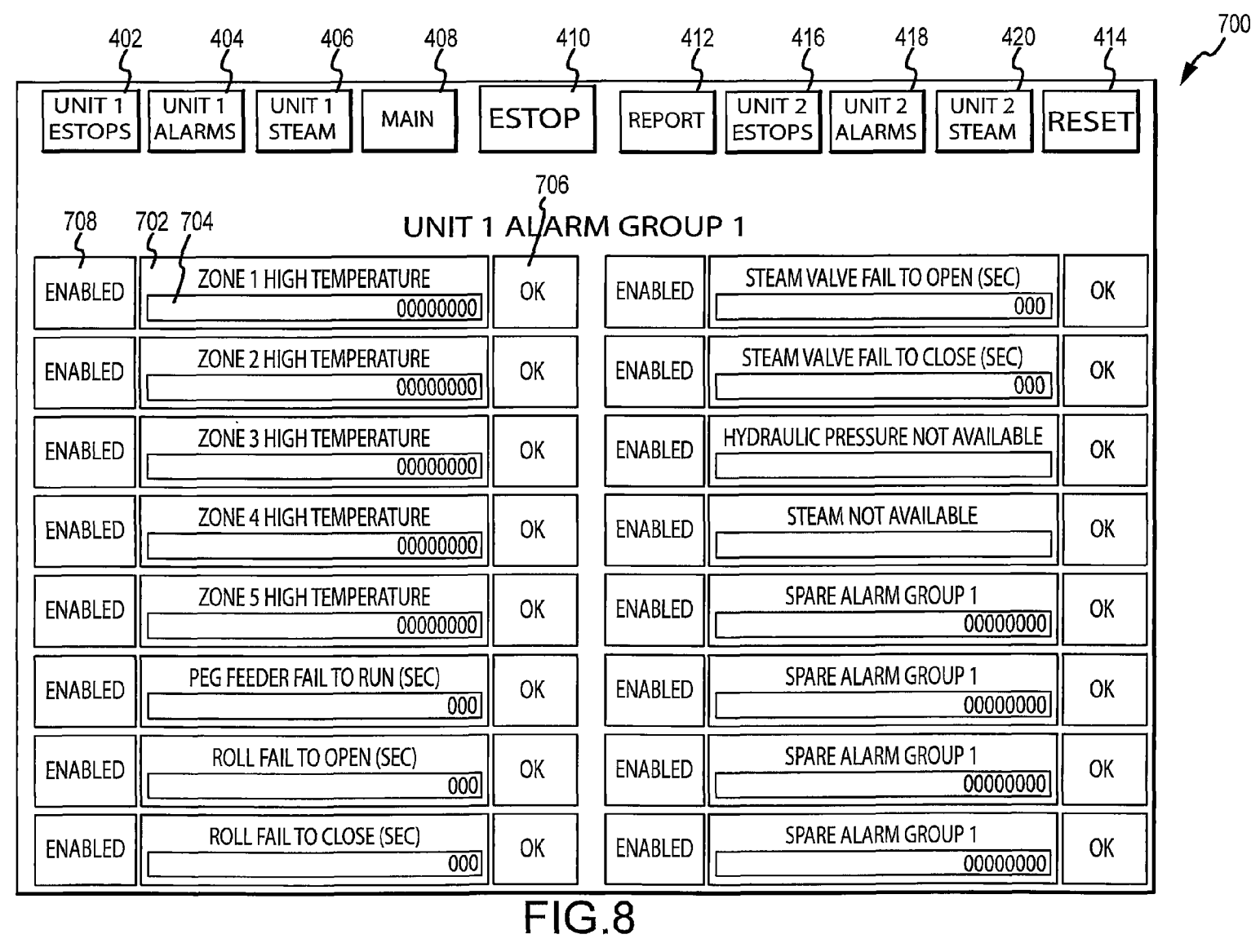

Referring to FIG. 8, another user interface screen 700 is provided that sets and controls various alarm conditions within the system. As with the other screens, this screen 700 also may include the standard toolbar illustrated in FIG. 5. The basic function of this user interface screen 700 is similar to what is described above with respect to FIG. 7. More specifically, various alarm conditions may be defined, such as a zone high temperature alarm condition 702. This alarm condition may be set by the operator entering the high temperature limit in data entry block 704 that would trigger the alarm if the zone reached that temperature. Clicking on the OK button 706 writes this high temperature command to the PLC thus establishing this as a high temperature alarm for zone 1. The user could enable or disable the alarm by selecting the enabled button 708. Each of the other alarm conditions listed in the user interface screen operates in a similar function. As listed, the other alarm conditions may include a high temperature limit for each zone, a peg feeder fail to run alarm, a roll fail to open alarm, a roll fail to close alarm, steam valve malfunctions, a hydraulic pressure not available alarm, a steam not available alarm, as well as spare alarms available for the user to select.

Once an E-stop alarm condition has occurred, these E-stops and/or alarms can be displayed in various ways on the status screen illustrated in FIG. 5, such as a text display or a schematic representation of the alarm at the particular location within the system. As previously referenced in FIG. 5, E-stops can be listed or displayed at block 452 and alarms can be shown at block 454.

While the present invention has been described with respect to a preferred embodiment, it shall be understood that various other changes and modifications may be made to the current invention in accordance with the scope of the claims appended hereto.

What is claimed is:

1. A method of controlling a grain flaking operation, said method comprising:
providing a grain flaking system including a steam chest for applying steam to a quantity of grain therein, a rolling station for passing the grain between a pair of spaced rollers, a feeding device for metering a quantity of grain from the steam chest through the rolling station, a hydraulic unit for selectively adjusting a desired spacing between the rollers, at least one video camera for monitoring processing of grain through the system, a system controller for controlling system parameters including temperatures within different zones of the steam chest, a pressure within the steam chest, speed of the metering device, spacing of the rollers, speed of the rollers, and startup and shutdown of the system;
conducting a grain flaking operation to flake the grain;
providing a calibration station communicating with the system controller to provide data regarding characteristics of grain that has been flaked in the system;
linking the system controller with a remote computer through a communication link including at least one of the Internet or a private computer network;
providing a user interface located at the remote computer enabling an operator to view a status of the grain flaking system and to issue commands through an input device to generate outputs sent from the system controller;

viewing a user interface screen including visual depictions of the steam chest, feeding device, and rollers;

providing a visual indication on the user interface screen of the status of system parameters to include temperatures within the steam chest and within the different zones, pressure within the steam chest, feeder speed, roller speed, and steam valve positions;

issuing a command to control the system in response to observed conditions of the system viewed on the user interface screen;

providing a steam control user interface screen for establishing control of steam provided to the steam chest, said steam control user interface screen including data entry blocks for entering desired temperatures within the different zones of the steam chest, positions of steam valves supplying steam to each different zone, and data entry blocks for a control loop, wherein data entered in the data entry blocks are used to create a programmed input to the grain flaking system whereby steam control is achieved based on a consideration of temperatures at the different zones.

2. A method, as claimed in claim 1, further including:
providing a visual indication on the steam control user interface screen showing a comparison of temperature in the steam chest as compared to time elapsed.

3. A method, as claimed in claim 1, further including:
providing a steam control user interface screen for establishing and setting emergency stops in the system, said steam control user interface screen including data entry blocks for setting conditions under which emergency stops are to occur.

4. A method, as claimed in claim 1, further including:
providing a alarm control user interface screen for establishing and setting alarms in the system, said alarm control user interface screen including data entry blocks for setting conditions under which alarms are to occur.

5. A method, as claimed in claim 4, wherein said alarms include at least one of a steam chest high temperature alarm, a peg feeder fail to run alarm, a roll fail to open alarm, a roll fail to close alarm, a steam valve fail to open alarm, a steam valve fail to close alarm, a hydraulic pressure not available alarm, and a steam not available alarm.

6. A method, as claimed in claim 1, further including:
providing an emergency stop user interface screen for establishing and setting emergency stops in the system, said emergency stop user interface screen including data entry blocks for setting conditions under which emergency stops are to occur.

7. A method, as claimed in claim 6, wherein said emergency stops include at least one of an operator interface emergency stop, an HMI emergency stop, a motor over current emergency stop, a motor under current emergency stop, a zone high temperature emergency stop, and a no hydraulic pressure emergency stop.

\* \* \* \* \*